(12) United States Patent
Gomes (10) Patent No.: US 7,717,327 B2
(45) Date of Patent: May 18, 2010

(54) CONTROLLING, MONITORING AND MANAGING SYSTEM APPLIED IN SELF-SERVICE EQUIPMENT FOR BANKING

(75) Inventor: Adolfo Roberto Teixeira Gomes, São Paulo (BR)

(73) Assignee: Itautec Philco S/A - Grupo Itautec Philco, Manaus/AM (BR)

( * ) Notice: Subject to any disclaimer, the term of this patent is extended or adjusted under 35 U.S.C. 154(b) by 958 days.

(21) Appl. No.: 10/566,749

(22) PCT Filed: Aug. 12, 2004

(86) PCT No.: PCT/BR2004/000149

§ 371 (c)(1),
(2), (4) Date: Aug. 3, 2006

(87) PCT Pub. No.: WO2005/015513

PCT Pub. Date: Feb. 17, 2005

(65) Prior Publication Data

US 2007/0034680 A1      Feb. 15, 2007

(30) Foreign Application Priority Data

Aug. 12, 2003    (BR)    .................................... 0303076

(51) Int. Cl.
*G06Q 40/00*        (2006.01)
*G07D 11/00*        (2006.01)
*G07F 19/00*        (2006.01)
*G06K 5/00*         (2006.01)
*G06F 7/08*         (2006.01)

(52) U.S. Cl. ...................... 235/379; 235/380; 235/381; 705/43

(58) Field of Classification Search ......... 235/379–381; 705/43; 902/8, 20, 30, 31
See application file for complete search history.

(56) References Cited

U.S. PATENT DOCUMENTS 4,355,369 A * 10/1982 Garvin ....................... 235/379
5,483,047 A *  1/1996 Ramachandran et al. .... 235/379

(Continued)

FOREIGN PATENT DOCUMENTS

WO          0212979          2/2002

*Primary Examiner*—Daniel Walsh
(74) *Attorney, Agent, or Firm*—Cozen O'Connor (57) ABSTRACT

Controlling, monitoring and managing system applied in self-service equipment for banking, a system (1) that previews, inside each of the self service banking terminals (2) associated to a specific bank, a Local Management Feature (3), connected through a Local Server (4), to a Control, Monitoring and Management Center (5), responsible for the general administration of the system, and provided with a Security Module (6), being that, when the administration of the place is local, Control, Monitoring and Managing Consoles are previewed (7); at the back part of the terminal (2), a command panel is previewed (8) bearing an interface to communicate with the Local Management Feature (3) previewed inside the above-mentioned terminal (2), as well as the Control, Monitoring and Management Center (5) and with Local Consoles for Control, Monitoring and Management (7); such control panel (8) is endowed with a keyboard (9), LCD display (10), magnetic and "smart card" reader (11, digital printing reader (12) and a biometric data comparison system; internally the command panel (8) is endowed with a Cryptography Module (13); the system (1) still previews one sole master key for each banking agency, being that each master key can be used in all terminals (2) associated to that specific agency.

26 Claims, 6 Drawing Sheets

U.S. PATENT DOCUMENTS

| | | | |
|---|---|---|---|
| 5,524,113 A * | 6/1996 | Gaddis | 370/395.32 |
| 5,642,922 A * | 7/1997 | Ramachandran et al. | 312/7.2 |
| 6,010,065 A * | 1/2000 | Ramachandran et al. | 235/379 |
| 6,484,936 B1 * | 11/2002 | Nicoll et al. | 235/379 |
| 6,520,410 B2 * | 2/2003 | Putman et al. | 235/380 |
| 6,626,357 B1 * | 9/2003 | Ross | 235/379 |
| 6,854,645 B1 * | 2/2005 | Somers et al. | 235/379 |
| 7,104,442 B2 * | 9/2006 | Kraft et al. | 235/379 |
| 2003/0006277 A1 * | 1/2003 | Maskatiya et al. | 235/379 |
| 2003/0046231 A1 * | 3/2003 | Wu | 705/43 |
| 2003/0069847 A1 * | 4/2003 | Dillon | 705/43 |
| 2004/0245333 A1 * | 12/2004 | Kraft et al. | 235/381 |
| 2005/0077142 A1 * | 4/2005 | Tam et al. | 194/217 |
| 2005/0109836 A1 * | 5/2005 | Ben-Aissa | 235/380 |
| 2005/0121513 A1 * | 6/2005 | Drummond et al. | 235/381 |
| 2005/0131824 A1 * | 6/2005 | Drummond et al. | 705/43 |
| 2005/0206501 A1 * | 9/2005 | Farhat | 340/5.82 |
| 2006/0255121 A1 * | 11/2006 | Putman et al. | 235/379 |
| 2007/0034680 A1 * | 2/2007 | Gomes | 235/379 |
| 2008/0041942 A1 * | 2/2008 | Aissa | 235/382 |
| 2008/0061128 A1 * | 3/2008 | Putman et al. | 235/379 |
| 2008/0065536 A1 * | 3/2008 | Barcelou | 705/43 |
| 2009/0026258 A1 * | 1/2009 | Shepley et al. | 235/379 |
| 2009/0057398 A1 * | 3/2009 | Douglass et al. | 235/379 |
| 2009/0083182 A1 * | 3/2009 | Coventry et al. | 705/43 |

* cited by examiner

FIG. 4
DET. A

Password Release & Safe Opening
- ATM goes into Maintenance Mode
- MS generates new lock combination
- MS informs Operator of new combination (Temp. PW)
- Operator digits password and opens safe

FIG. 8

End of Operation
- Closing of the safe
- MS checks sensors
- Operator indicates successful operation in DGL
- MS erases temporary password
- Operator informs operations performed in DGL
- Operator receives next visit information

FIG. 9

CONTROLLING, MONITORING AND MANAGING SYSTEM APPLIED IN SELF-SERVICE EQUIPMENT FOR BANKING

FIELD OF THE INVENTION

Equipment used in bank automation systems, commonly called self-service banking equipment or bank automatic teller terminals (ATMs), is already technically known. This equipment is used for the automation and decentralization of general bank services. It allows the user to request and obtain certain services through an interface that interacts directly with the bank without requiring another person.

BACKGROUND OF THE INVENTION

In the state of the art the bank automatic teller terminals (ATMs) are known and common in the market, designed to automation and non-centralization of the banking services in general, in said terminals the user benefits from an adequate interface to request and obtain given services directly interacting with the equipment without the interference of any person.

Such ATMs are located inside bank branches or inside appendages integrated to said branches or inside boxes foreseen in several locations, whether external (in streets and avenues of the city) or internal (in shopping centers, clubs, schools, parking lots, gas stations, etc.).

The great problem with these terminals is that they are not provided with any system capable of allowing the control and management of all operations performed by the authorized operators in all terminals of that bank.

In fact, at present, each ATM terminal has a respective physical switch and an off-line electronic secret combination (disconnected from the network), and the switch remains in possession of the employee in charge of that equipment and designated to accomplish the removal of documents and money deposited inside the same (specifically inside the safe of the depository provided in the equipment) as well as to periodically supply the equipment with money (specifically the safe of the dispenser or draft terminal provided in the equipment).

With this, a great number of ATM terminals can normally be opened at the same time and there is no control of the operations performed by each employee or a time schedule or verification of the reason for opening. This is because the current hardware and software architecture of the common bank automatic teller terminals allow all the ATMs be opened simultaneously at undue times without any control and without audit tracking (history of operations), which is not acceptable as far as security is involved. In summary, nobody knows who opened it, much less when or why it was opened.

Thus, due to the lack of a system capable of allowing monitoring, management and control of the operations in the bank automatic teller terminals, the number of assaults occurred in said terminals is increasingly greater, many of them occurring during the opening or closing thereof by the operators; and such assaults are generally successful since the ATM terminals do not count on any security system capable of perceiving their occurrence and actuating means to bar the performance of the operations.

SUMMARY AND OBJECTS OF THE INVENTION

Aiming to solve this drawback of the well known bank automatic teller terminals, the applicant developed the new "CONTROLLING, MONITORING AND MANAGING SYSTEM APPLIED IN SELF-SERVICE EQUIPMENT FOR BANKING", which is the object of present patent.

With the provision of this new system, it is possible to control, monitor and manage all operations performed in all bank automatic teller terminals simultaneously as well as to determine and control the time to perform those operations.

For such, the currently invented system is provided with a Local Management Device in each of the ATM terminals associated to a given bank, each Device being interconnected to a Control, Monitoring and Management Center provided with a Safety Module.

A command panel is arranged in the rear portion of said terminals, and through it the operator establishes a communication interface both with the Local Management Device provided inside the ATM terminal and with the Control, Monitoring and Management Center; thus, benefiting from that interface, the operator performs his due identification and only after validation of said identification the operator is capable of starting the operations; also benefiting from that interface, the operator can communicate with the Control, Monitoring and Management Center providing information thereto and/or receiving information therefrom.

The system in reference foresees several manners for identifying the operator, namely: magnetic card and smart card reader, password identifier, fingerprint reader, and biometric data comparator.

The biometric data comparator uses the biometric data of the user (iris, face, fingerprint, voice) previously recorded in a database for comparison at the moment of performing the operation desired by said user without specification, that is, you can couple or implement any of these kinds of comparison (iris, face, fingerprint, voice) with the database previously supplied with the data (iris, face, fingerprint, voice) of the user.

The present system is also provided with a unique physical switch for each set of ATM terminals, each unique switch being used in all ATM terminals associated to that respective set, and the switches of the several sets are differentiated from each other in order to relate each one always to its respective set. The same bank branch can have several sets of ATMs and allow the simultaneous supply of the same.

With the present control, monitoring and management system, it is possible to control, monitor and manage simultaneously all operations performed by the authorized operators in all bank automatic teller terminals associated to a set of ATMs, thus providing more security and reliability to said terminals; on the other hand, a substantial acceleration is obtained in the operational processes, involving the bank automatic teller terminals without any harm to safety.

BRIEF DESCRIPTION OF THE DRAWINGS

A more complete appreciation of the present invention and many of the attendant advantages thereof will be readily understood by reference to the following description when taken in conjunction with the accompanying drawings, in which.

DETAILED DESCRIPTION OF THE INVENTION

Figure 1:
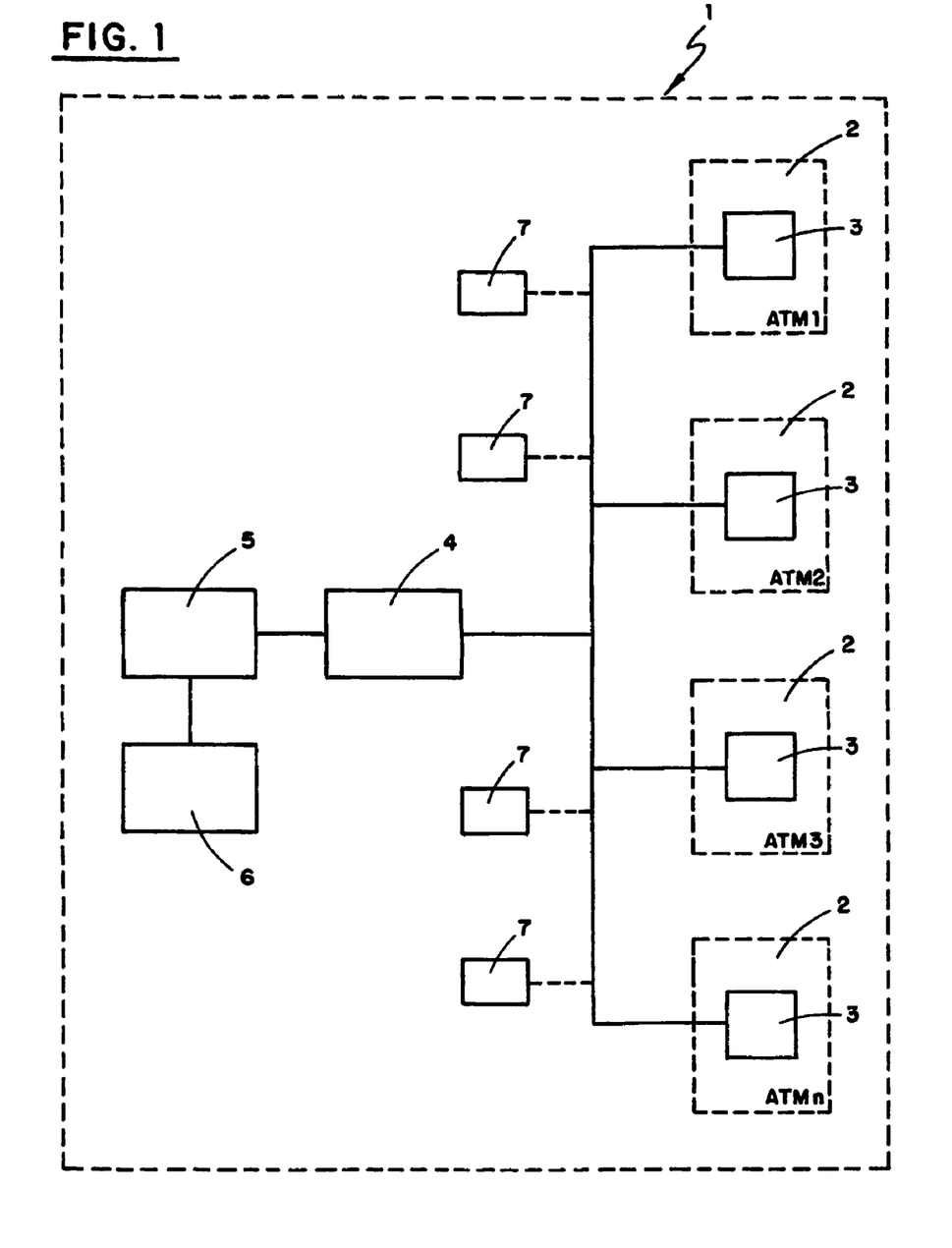
FIGS. 1 and 2 are block diagrams schematically illustrating the basic components of the control, monitoring and management system of the invention.
Figure 2:
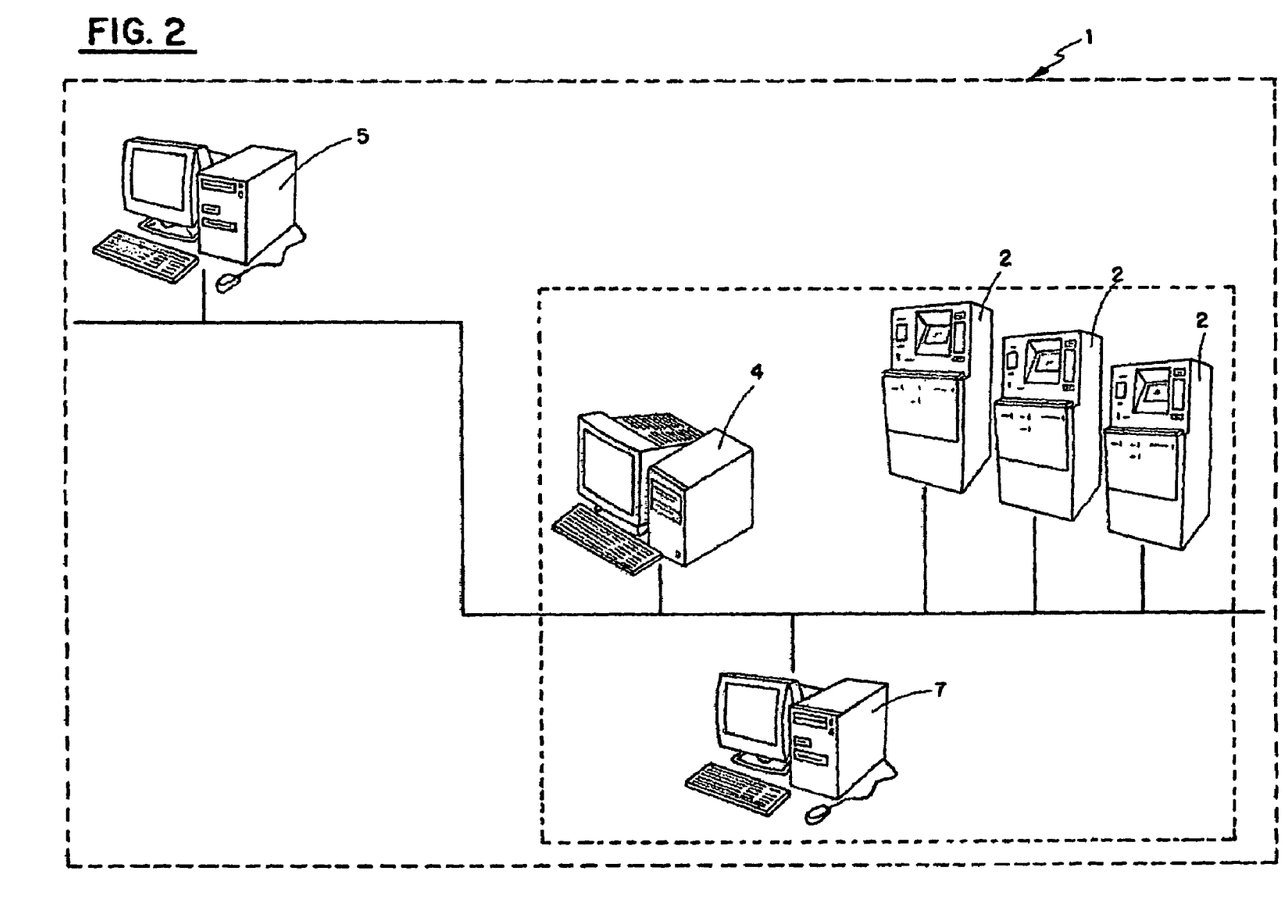

The object of the present invention patent refers to a "CONTROLLING, MONITORING AND MANAGING SYSTEM APPLIED IN SELF-SERVICE EQUIPMENT FOR BANKING", this system (1), inside each of the bank automatic teller terminals (2) associated to a given bank, is provided with a Local Management Device (3) interconnected by means of a Local Server (4) to a Control, Monitoring and Management Center (5) responsible for the general management of the system and provided with a Safety Module (6); optionally the management of the system can be local, and for such purpose, Local Consoles for Control, Monitoring and Management (7) are provided (see FIGS. 1 and 2).

Figure 3:
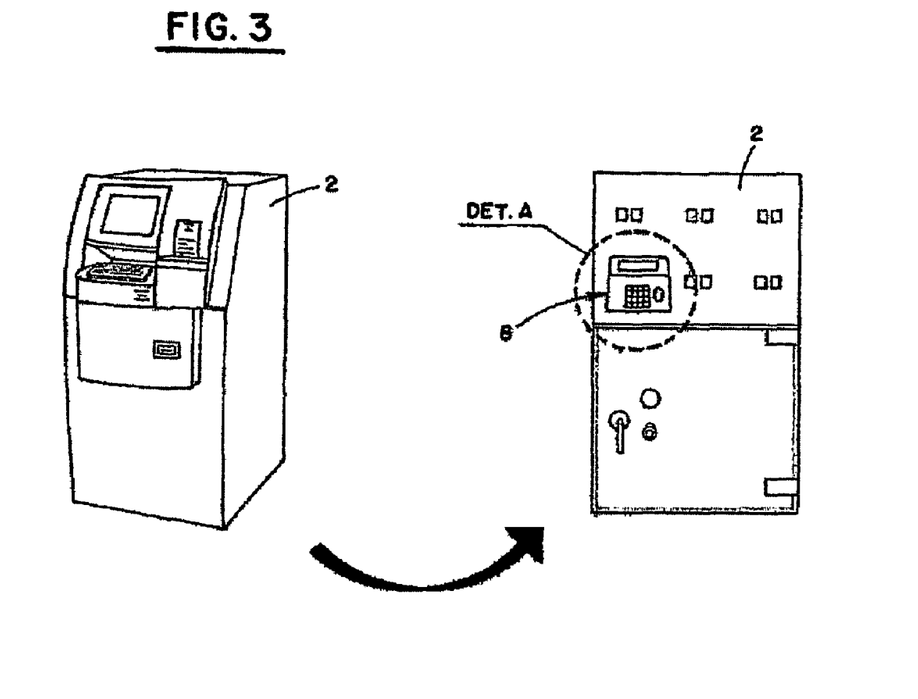
FIG. 3 also schematically illustrates, through frontal perspective and rear view, one bank automatic teller terminal provided with said control, monitoring and management system.

A command panel (8) is arranged in the rear portion of the terminal (2) (see FIG. 3), which is equipped with an interface for communication with the Local Management Device (3) provided inside said terminal (2) as well as with the Control, Monitoring and Management Center (5) and with the Local Consoles for Control, Monitoring and Management (7); thus, benefiting from that interface, the operator performs the due identification and only after validation of that identification, the operator is capable of starting the operations; also benefiting from that interface, the operator can communicate with the Center (5) and the Consoles (7) providing them with information and/or receiving information from them.

Figure 4:
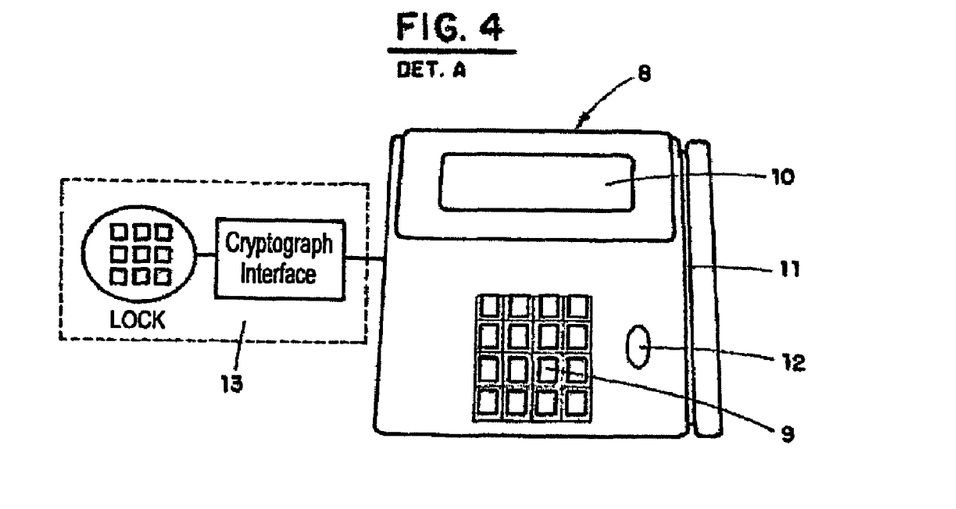
FIG. 4 is an enlarged schematic detail of the command panel provided in the rear portion of the terminal, through which the operator interacts with the components of the system.
Figure 5:
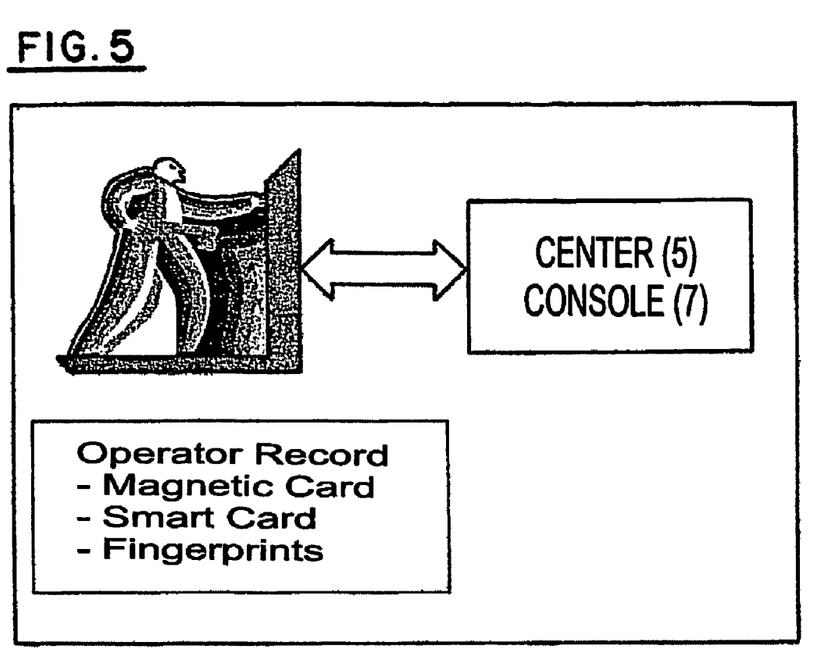
FIGS. 5-8 illustrate through block diagrams how to perform: the identification of the operator in relation to the bank automatic teller terminals, the validation of that identification and the permission to start the performance of the operations by the operator (record of operator), the information of the operations to be performed by the operator and the confirmation of those operations by the system (record of "service route"), the supply of a temporary password for the operator to be typed in the safe lock for opening the safe (release of the password and opening of the safe), the performance of the operations, the indication of "successful operation", and the information of the next visit (end of operation)

As illustrated in the detail of FIG. 4, said command panel (8) is provided with a keyboard (9) with 16 keys, an LCD display (10) (8 lines×40 columns), a magnetic card or smart card reader (11) and a fingerprint reader (12).

It may also be provided with a biometric data comparator (not shown) using the biometric data of the user (iris, face, fingerprint, voice) previously recorded in a database for comparison at the moment of performing the operation desired by said user without specification, that is, any one of these kinds of comparison (iris, face, fingerprint, voice) can be coupled or implemented with the database previously supplied with the data (iris, face, fingerprint, voice) of the user.

Internally, the command panel (8) is provided with a Cryptography Module (13) responsible for the transformation of the input data into low-level language (hardware) for future codification and decoding by the system.

Thus, the present system provides several manners of certifying the identity of the operator, which may be used together or separately, namely: reading a magnetic card accompanied by a password known only by the authorized operator, reading a smart card, reading the fingerprint of the authorized operator and comparison of biometric data.

In addition to the cryptography module (13) an increase is obtained in the safety of data transmission.

The present system is also provided with a physical switch unique for each set of ATM terminals, each unique switch being used in all ATM terminals (2) associated to that respective set, and the switches of the several sets are differentiated from each other in order to relate each one always to its respective set. The same bank branch can have several sets of ATMs and allow the simultaneous supply of the same.

As illustrated in the sequence of FIGS. 5-8, in order to start the supply and/or bleed (supply and/or removal of documents/money) of an automatic teller terminal (2) and/or the general maintenance services in said terminal, the operator first needs to be recorded in the system (step of recording operator—FIG. 5), for such purpose, the operator uses the command panel (8) provided in the rear portion of the terminal (2) to communicate with the Control, Monitoring and Management Center (5) or, in case of local management, with the Local Consoles for Control, Monitoring and Management (7); the operator benefits from one or more manner of identification foreseen in the system to identify himself (magnetic card, smart card, fingerprint, biometric data) and since the identification is confirmed, the Center (5) allows the operator to perform the operations.

Figure 6:
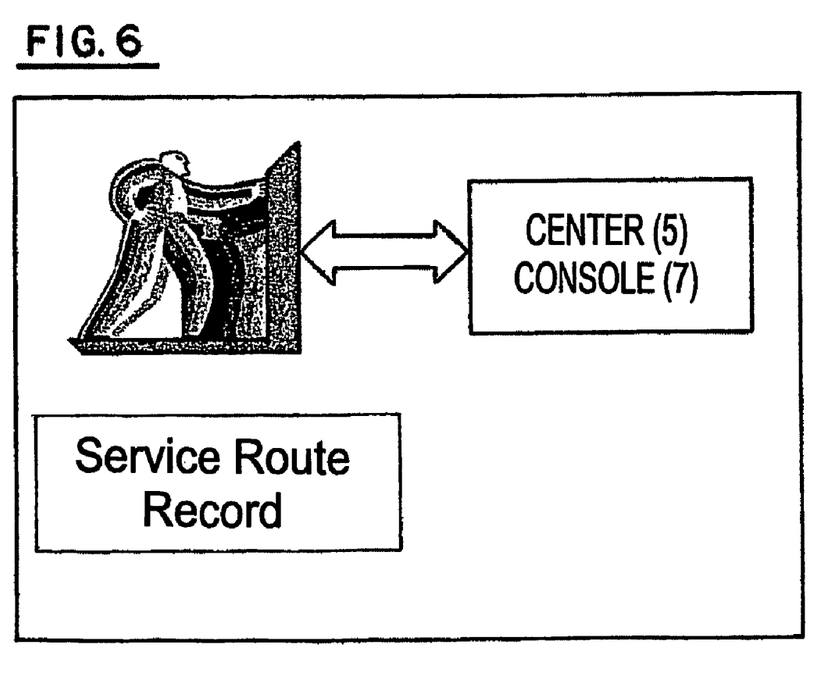

Next, always benefiting from the command panel (8) and still in communication with the Control, Monitoring and Management Center (5), or in case of local management, with the Local Consoles for Control, Monitoring and Management (7), the operator records his "route of services" (the operations to be performed by him in the terminal) following an operational map previously determined by the system (step of recording the "route of services"—FIG. 6).

Figure 7:
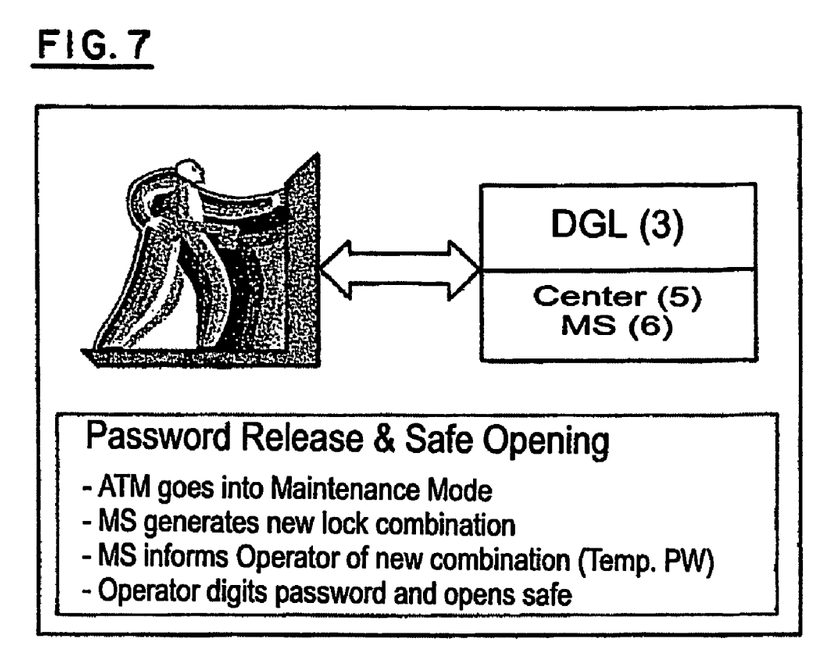

Once the route of services is confirmed, the Center (5) switches the Local Management Device (3) provided in terminal (2) to the "Maintenance" mode, and the Safety Mode (6) of said Center (5) releases a "temporary password" (a new secret combination) loading this new code in the safe lock of the terminal (2), the Safety Module (6) informs the operator through display (10) of command panel (8) the new valid secret combination; the operator then types the secret combination received in the safe lock, accomplishing the opening of the same (step of releasing password and opening the safe—FIG. 7).

Figure 8:
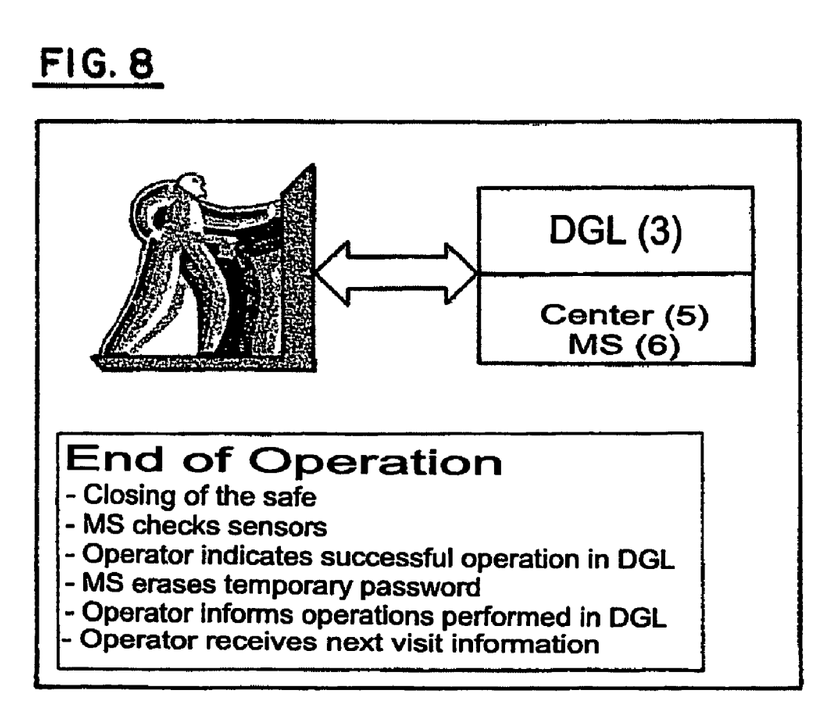

Once the operations are performed and after the operator closes the safe, the Safety Module (6) checks the sensors, the operator informs the Local Management Device (3) through the keyboard (9) of the command panel (8) the successful end of operations; the Safety Module then clears the "temporary password" from the lock; also via keyboard (9) the operator informs the Device (3) the codes of the operations performed (for example, replenishment of the safe, bleeding, maintenance services, etc.) and thus the operations performed in that terminal (2) are duly recorded, as well as when and by whom the same were performed; the operator then receives the information on the next visit (step of ending the operation—FIG. 8).

Figure 9:
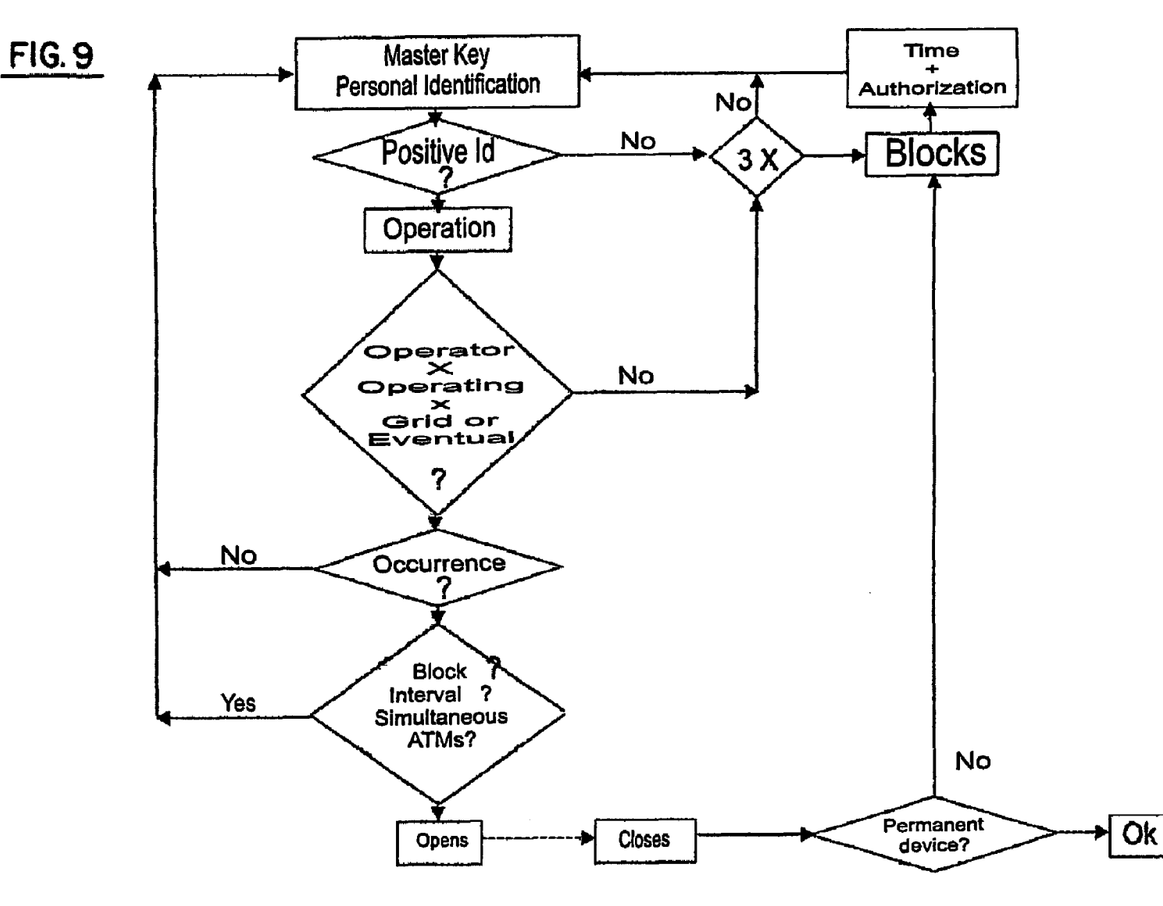
FIG. 9 is a flowchart indicating the steps of the procedures foreseen by the present system illustrated in FIGS. 5-8.

The flowchart of FIG. 9 illustrates the various steps of the procedures described above.

The "CONTROLLING, MONITORING AND MANAGING SYSTEM APPLIED IN SELF-SERVICE EQUIPMENT FOR BANKING" (1) of the present invention allows the performance of a series of procedures resulting in real safety measures capable of inhibiting the occurrence of assaults. Among such procedures we can mention:

The system provides a balance between safety and operation feasibility;

The system allows only a given minimum number of terminals (2) to be opened at the same time;

After closing any one of terminals (2) associated to a given branch, the system in reference provides a delay time period for the opening of any other terminal of that same branch; in other words, during that time interval after the closure of an ATM, the opening of any other ATM is not possible;

The system provides opening intervals for the performance of operations referring to removal and supply of documents and/or money, as well as for performing technical assistance services (maintenance);

The system provides the determination of time schedules for the performance of those operations and technical services;

The system provides local and remote management (through a console);

The system allows alteration of the configuration parameters, however, it allows the validation thereof only after a pre-determined period of time (lack of validation); this impedes the assaulter to be successful when requiring the operator to modify the parameters at the moment of an assault; the operator can alter the parameters, however, the validation thereof will only occur at a certain time later inhibiting the operations by the assaulter;

The system allows identifying if terminals are being used by clients, and which terminals, identifying the ones that are "free";

The system allows checking if the comparison "reason× occurrence" is true: if during an operation of removal of deposits, there is the removal of the bill dispenser cassettes, all the openings of other terminals will be inhibited;

The system provides solutions for situations of communication with the network interrupted or interruption in the supply of electrical power;

The system can provide that the terminal will always be always opened by two persons as an additional safety measure;

The system allows tracking the operations (who opened, when opened and why opened);

The system allows the definition of different configurations according to the branches;

The system allows the definition of different criteria for unlocking according to the branches;

The same branch can have groups of terminals and allow the simultaneous supply of all of them;

The command panel (8) shows what is happening with each terminal associated to a given branch;

The panel (8) advises about the occurrence of an assault;

The operational of the branch, which establishes the procedures of the terminal with the central, is disclosed to help the own operators;

The system provides a contingency password (generated in the installation of the machine) allowing the off-line opening of the terminal; the whole contingency procedure (in case of off-line operation—disconnected from the network) is in the machine; there is a password generated when installing the machine, which allows to open the ATM terminal under contingency; the system may use information exchange (counter-password after checking the state of the use of the terminal) with another entity to permit off-line opening; that information exchange can be made via telephone or other means; and there is a coercion password provided;

The system allows information exchange among several terminals (2) and among these and the Center (5) and the Consoles (7) to permit the off-line opening of the terminal.

With all these innovations, the present system provides control, monitoring and management of all operations performed in all of the bank automatic teller terminals simultaneously, as well as the determination and control of the time to perform such operations, providing a number of technical and functional advantages.

Furthermore, the system permits to increase substantially the safety in bank automatic teller terminals, consequently increasing the reliability thereof. On the other hand, the system provides substantial acceleration in the operational processes involving the bank automatic teller terminals without any harm to safety.

Although specifically developed for bank automatic teller terminals (ATMs), the present control, monitoring and managing system can be employed in other applications, among which, to open doors in premises of the same network (for example, supermarkets, stores, restaurants, etc.) which would have synchronized opening, to open equipment in general possessing and requiring lock with password, as a result, in all systems, equipment, apparatuses, mechanisms, devices or machines where one desires to control, monitor and manage the opening of locks coupled to electronic passwords for internal movement.

The invention claimed is:

1. A controlling, monitoring and managing system applied in banking self-service equipment, the system (1) comprising, inside each of the bank automatic teller terminals (2) associated to a given set of ATMs, a Local Management Device (3) interconnected by means of a Local Server (4) to a Control, Monitoring and Management Center (5) responsible for the general management of the system and provided with a Safety Module (6); Consoles operable to control, monitor and manage the system (7); a command panel (8) whereby service personnel service the ATM, provided in the rear portion of terminal (2), equipped with an interface for communication with the Local Management Device (3) provided inside said terminal (2) as well as with the Control, Monitoring and Management Center (5) and with the Local Consoles for Control, Monitoring and Management (7); said command panel (8) is provided with keyboard (9), LCD display (10), magnetic card or smart card reader (11), fingerprint reader (12), and biometric data comparator using one or more biometric data of the service personnel (iris, face, fingerprint, voice) previously recorded in a database for comparison at the moment of performing a desired system servicing operation by said service personnel; internally, the command panel (8) is provided with a Cryptography Module (13) responsible for the transformation of the input data into low-level language (hardware) for future codification and decoding by the system (software); the system (1) is also provided with a unique physical switch for each set of ATM terminals, each unique switch being used in all ATM terminals (2) associated to that respective set, and the switches of the various sets are differentiated from each other in order to relate each one always to its respective set.

2. A controlling, monitoring and managing system applied in self-service equipment for banking according to claim 1, wherein a communication interface between the command panel (8) and the Local Management Device (3), the Control, Monitoring and Management Center (5) and the Local Consoles for Control, Monitoring and Management (7) allows the identification of the operator, the validation of that identification, the identification of the operations to be performed, and the validation of those operations.

3. A controlling, monitoring and managing system applied in self-service equipment for banking according to claim 1, wherein several manners are provided to validate the identity of the operator, used together or separately, namely: reading a magnetic card accompanied by a password only known by the authorized operator, reading of a smart card, reading of fingerprint of the authorized operator, and comparison of biometric data.

4. A controlling, monitoring and managing system applied in self-service equipment for banking according to claim 1, wherein to start the operations of replenishment and/or bleeding (supply and/or removal of documents/money) of a bank automatic teller terminal (20), and/or general maintenance services, foresee the initial step of recording the operator, in which the operator uses the command panel (8) to communicate with the Control, Monitoring and Management Center (5) and with the Local Consoles for Control, Monitoring and Management (7); the operator uses one or more manners of identification provided by the system to identify and, once the identification is confirmed, the Center (5) permits the operator to perform the operations.

5. A controlling, monitoring and managing system applied in self-service equipment for banking according to claim 1, further comprising providing in the next step the recording of the route of services, that is, the operations to be performed, in which benefitting from the command panel (8) and still in communication with the Control, Monitoring and Management Center (5), or with the Local Consoles for Control, Monitoring and Management (7), the operator informs by codes the operations to be performed by him in the terminal following an operational map previously determined by the system.

6. A controlling, monitoring and managing system applied in self-service equipment for banking according to claim 1, further comprising the subsequent step of releasing password and opening the safe, in which once confirmed the route of services, the Center (5) switches the Local Management Device (3) provided in terminal (2) to "Maintenance" mode, and the Safety Module (6) of said Center (5) releases a "temporary password" (a new secret combination) loading this new code in the safe lock of terminal (2); the Safety Module (6) informs the operator through display (10) of the command panel (8) the new valid secret combination; the operator types the secret combination received in the safe lock opening the same.

7. A controlling, monitoring and managing system applied in self-service equipment for banking according to claim 1, further comprising a subsequent step of the ending operation, in which once the operations are performed and after the operator closes the safe, the Safety Module (6) checks the sensors, the operator informs the Local Management Device (3) through the keyboard (9) of the command panel (8) the successful end of operations; the Safety Module clears the "temporary password" from the lock; also via keyboard (9), the operator informs the Device (3) the codes of the operations performed (for example, replenishment of the safe, bleeding, maintenance services, etc.) and the operations performed are duly recorded, as well as when the same were performed, and by whom they were performed; the operator then receives the information on the next visit.

8. A controlling, monitoring and managing system applied in self-service equipment for banking according to claim 1, further comprising allowing only a given minimum number of terminals (2) to be opened at the same time.

9. A controlling, monitoring and managing system applied in self-service equipment for banking according to claim 1, further comprising providing after closing of any one of terminals (2) associated to a given branch a delay time period for opening any other terminal of that same branch.

10. A controlling, monitoring and managing system applied in self-service equipment for banking according to claim 1, further comprising providing opening intervals for performing the operations of replenishment and/or bleeding as well as technical assistance services (maintenance).

11. A controlling, monitoring and managing system applied in self-service equipment for banking according to claim 1, further comprising providing the determination of time schedules for performing the operations and technical services.

12. A controlling, monitoring and managing system applied in self-service equipment for banking according to claim 1, further comprising providing local and remote management of terminals.

13. A controlling, monitoring and managing system applied in self-service equipment for banking according to claim 1, further comprising allowing alterations of configuration parameters, however, permitting the validation thereof only after a pre-determined period of time (lack of validation).

14. A controlling, monitoring and managing system applied in self-service equipment for banking according to claim 1, further comprising identifying the terminals that are being used and the ones that are free.

15. A controlling, monitoring and managing system applied in self-service equipment for banking according to claim 1, further comprising inhibiting the opening of all other terminals when during the operation of removal of deposits in a terminal there is the removal of the bill dispenser cassettes.

16. A controlling, monitoring and managing system applied in self-service equipment for banking according to claim 1, further comprising providing solutions for situations of communication with the network interrupted and interruption in the supply of electric power.

17. A controlling, monitoring and managing system applied in self-service equipment for banking according to claim 1, wherein the terminal is always opened by two persons as an additional safety measure.

18. A controlling, monitoring and managing system applied in self-service equipment for banking according to claim 1, further comprising allowing tracking of operations.

19. A controlling, monitoring and managing system applied in self-service equipment for banking according to claim 1, further comprising allowing definition of different configurations according to the branches.

20. A controlling, monitoring and managing system applied in self-service equipment for banking according to claim 1, further comprising allowing the definition of different unlocking criteria according to the branches.

21. A controlling, monitoring and managing system applied in self-service equipment for banking according to claim 1, wherein a branch possesses groups of terminals and that all of them are supplied simultaneously.

22. A controlling, monitoring and managing system applied in self-service equipment for banking according to claim 1, wherein the command panel (8) informing online and in real time what is happening in each terminal associated to a given branch.

23. A controlling, monitoring and managing system applied in self-service equipment for banking according to claim 1, wherein the panel (8) informing the occurrence of an assault.

24. A controlling, monitoring and managing system applied in self-service equipment for banking according to claim 1, wherein the operational of the branch that establishes the procedures of terminals (2) with Center (5) and Consoles (7) is disclosed to help the own operators.

25. A controlling, monitoring and managing system applied in self-service equipment for banking according to claim 1, further comprising providing a contingency password (generated when installing the machine) that allows the off-line opening of the terminal.

26. A controlling, monitoring and managing system applied in self-service equipment for banking according to claim 1, further comprising allowing the exchange of information among several terminals (2) and between these and Center (5) and Consoles (7) to permit the off-line opening.

* * * * *